US00RE33868E

United States Patent [19]

Maus et al.

[11] E Patent Number: Re. 33,868

[45] Reissued Date of Patent: Apr. 7, 1992

[54] METHOD OF FASTENING DRIVE ELEMENTS OF A HOLLOW SHAFT

[75] Inventors: Wolfgang Maus; Helmut Swars, both of Bergisch Gladbach, Fed. Rep. of Germany

[73] Assignee: Mannesmann Fahrzeugtechnik GmbH, Duisburg-Huckingen, Fed. Rep. of Germany

[21] Appl. No.: 488,236

[22] Filed: Mar. 2, 1990

Related U.S. Patent Documents

Reissue of:

[64] Patent No.: 4,750,250
Issued: Jun. 14, 1988
Appl. No.: 900,387
Filed: Aug. 26, 1986

[30] Foreign Application Priority Data

Aug. 27, 1985 [DE] Fed. Rep. of Germany ..... 3530600

[51] Int. Cl.[5] ..... B21D 39/00

[52] U.S. Cl. ..... 29/888.1; 29/523; 72/58; 74/567

[58] Field of Search ..... 29/523, 888.1, 890.044, 29/890.046, 522.1; 74/567; 72/58

[56] References Cited

U.S. PATENT DOCUMENTS

| | | | |
|---|---|---|---|
| 2,892,254 | 6/1959 | Garvin | 29/523 |
| 3,131,467 | 5/1964 | Thaller | 29/421 |
| 3,977,068 | 8/1976 | Krips | 29/890.044 |
| 4,210,991 | 7/1980 | Cooper, Jr. | 29/421 X |
| 4,368,571 | 1/1983 | Cooper, Jr. . | |
| 4,420,867 | 12/1983 | Busse . | |
| 4,445,261 | 5/1984 | Kelly | 29/890.044 |
| 4,597,365 | 7/1986 | Madaffer | 29/523 |
| 4,608,739 | 9/1986 | Miller | 29/421 X |
| 4,622,732 | 11/1986 | Broderick | 29/523 X |
| 4,660,269 | 4/1987 | Suzuki | 29/523 |
| 4,727,635 | 3/1988 | Krips et al. | 29/523 |
| 4,781,076 | 11/1988 | Hartnett et al. | 74/567 |

FOREIGN PATENT DOCUMENTS

| | | | |
|---|---|---|---|
| 2336241 | 7/1973 | Fed. Rep. of Germany . | |
| 2232438 | 7/1978 | Fed. Rep. of Germany . | |
| 2914095 | 10/1980 | Fed. Rep. of Germany . | |
| 2922509 | 12/1980 | Fed. Rep. of Germany . | |
| 2531883 | 2/1984 | France . | |
| 1232338 | 1/1985 | U.S.S.R. | 29/523 |
| 1117816 | 6/1968 | United Kingdom | 29/523 |

*Primary Examiner*—Irene Cuda

*Attorney, Agent, or Firm*—Herbert L. Lerner; Laurence A. Greenberg

[57] ABSTRACT

Method fastening drive elements on a hollow shaft, which comprises:

pushing n drive elements with a thickness a over a hollow shaft, retaining the drive elements at mutual spacings b and in respective desired azimuthal positions by means of holding devices;

providing active sections of a material with a given limit of elasticity, a length c, mutual spacings d and being bounded by sealing lips on a hydraulic expanding device so that [n (a+b)=n (c+d)] $n.a+(n-1)b=n.c+(n-1)d$, pushing the hydraulic expanding device into the hollow shaft; and applying a pressure through the hollow shaft to the active sections stressing the material of the active sections radially beyond the given limit of elasticity.

3 Claims, 1 Drawing Sheet

METHOD OF FASTENING DRIVE ELEMENTS OF A HOLLOW SHAFT

Figure 1:
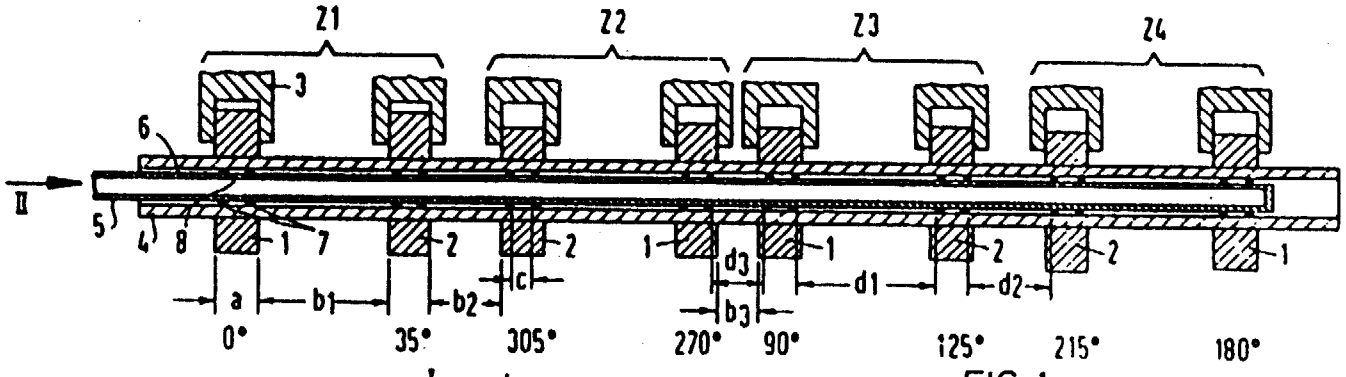

Matter enclosed in heavy brackets [ ] appears in the original patent but forms no part of this reissue specification; matter printed in italics indicates the additions made by reissue.

The invention relates to a method of fastening drive elements on a hollow shaft.

The method is described below by using an example of a cam shaft for four-cycle internal combustion engines, but it is similarly applicable to other drive elements, such gears, bearing shells and the like which are to be fastened to a smooth shaft, so as to be secure against rotation and axial shifting. Although numerous fastening possibilities are known from German Published, Non-Prosecuted Application No. DE-OS 23 36 241, they appear to be too costly to be used for mass production.

It is accordingly an object of the invention to provide a method of fastening drive elements on a hollow shaft, which overcomes the hereinafore-mentioned disadvantages of the heretofore-known devices of this general type, and which permits a maximum number of drive elements to be simultaneously fastened on a shaft with a minimum number of operations. Instead of expensive turned parts, less expensively producible precision tubing is to be used for the shafts, and machining and heat treating operations which may be required on the drive elements themselves should be performed prior to the actual assembly.

With the foregoing and other objects in view there is provided, in accordance with the invention, a method of fastening drive elements on a hollow shaft, which comprises:

pushing n drive elements with a thickness a over a hollow shaft, retaining the drive elements at mutual spacings b and in respective desired azimuthal positions to be assumed by means of holding devices; providing active sections of a material with a given limit of elasticity, a length c, mutual spacings d and being bounded by sealing lips on a hydraulic expanding device so that [$n(a+b)=n(c+d)$] $n.a+(n-1)b=n.c+(n-1)d$, pushing the hydraulic expanding device into the hollow shaft; and applying a pressure through the hollow shaft to the active sections stressing the material of the active sections radially beyond the given limit of elasticity.

Hydraulic expanding devices of this type are known in principle, although each has only one active section, e.g. for the fastening of heat exchanger tubes in tube plates. The method according to the invention is also well adapted to the pairing of materials such as a relatively tough, readily deformable shaft material with the higher grade, normally hardened material of the drive elements, which is desirable for other reasons as well. It is not difficult to adapt the hydraulic expanding device to the number of drive elements to be fastened on the shaft in one operation and to adapt it to their possibly uneven mutual spacings.

In accordance with a concomitant mode of the invention, there is provided a method which comprises making $a=c$ or $b=d$. This method is used because it appears advantageous to utilize the entire contact area between the drive elements and the associated shaft sections to produce the positive frictional connection.

Other features which are considered as characteristic for the invention are set forth in the appended claims.

Although the invention is illustrated and described herein as embodied in a method of fastening drive elements on a hollow shaft, it is nevertheless not intended to be limited to the details shown, since various modifications may be made therein without departing from the spirit of the invention and within the scope and range of equivalents of the claims.

Figure 2:
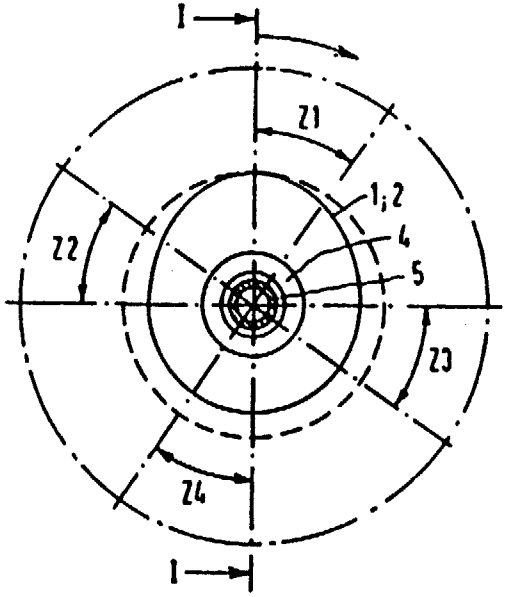

The invention, however, together with additional objects and advantages thereof will be best understood from the following description when read in connection with the accompanying drawings, in which:

FIG. 1 is a fragmentary, diagrammatic, axial, longitudinal sectional view taken along the line I—I in FIG. 2, in the direction of the arrows; and FIG. 2 is an elevational view as seen along the arrow II in FIG. 1.

Referring now to FIGS. 1 and 2 of the drawings in detail, there is seen a cam shaft for a four-cylinder internal combustion engine such as is used in motor vehicles, having cylinders Z 1 to Z 4 with cams 1 which control intake valves and other cams Z which control outlet valves. The cams are retained by an appropriate number of holding tools or devices 3 which may be tong or clamp-shaped. The holding devices are in respectively required azimuthal alignment, are accurately spaced axially and are coaxial. The cams or drive elements 1 and 2 are finished, i.e. ground and hardened. The cams or drive elements have a uniform thickness, but need not necessarily have the illustrated uniformity and are disposed at distances $b_1$, $b_2$, $b_3$ from each other, which may vary if desired. A hollow shaft 4 formed of a relatively tough steel is pushed through bores formed in the cams 1, 2 with a sightly larger diameter than the shaft. A hydraulic expanding device 5 is pushed into the hollow shaft 4 when the shaft is pushed through the bores or in a second operation. In addition to conventional non-illustrated pressure generating devices, the expanding device 5 is formed of a tube 6 on which active sections are installed at varying distances ($d_1$, $d_2$, $d_3$ corresponding to the mutual spacings of the cams or drive elements. The active sections have a width c which may be narrower than a width a of the cams as shown but preferably is the same. In the latter case, the distances $b_1$, $b_2$, $b_3$ between the cams are naturally equal to the distances $d_1$, $d_2$, $d_3$. The active sections are formed by elastic rings or sealing lips 7 which are inserted in pairs into grooves formed in the surface of the tube 6. At least one hole 8 is provided in the tube 6 between each two rings of a pair through which hydraulic fluid can escape into the space between the elements 7. The elements 7 are constructed in such a way that they are slightly smaller than the inside diameter of the tube 4 in their relaxed state while contacting the inner wall surface of the tube 4 when pressure is applied, preventing the escape of the hydraulic fluid from the active sections to a large extent. The hydraulic fluid pressure is sufficient to expand the tube 4 in the vicinity of the active sections by exceeding the elasticity limit. After the conclusion of this process in all of the active sections, the device 5 is simultaneously made pressureless again for all drive elements and is pulled out of the tube 4. The holding devices 3 can then be opened and the cam shaft can be transported to the location of the next operation.

FIG. 2 shows the sectors associated with the individual cylinders Z 1 AND Z 4 in which the valves associated with the cylinders must be controlled and which accordingly determine the cam orientation.

The foregoing is a description corresponding in substance to German Application No. P 35 30 600.9, filed Aug. 27, 1985, the International priority of which is being claimed for the instant application, and which is hereby made part of this application. Any material discrepancies between the foregoing specification and the afore-mentioned corresponding German application are to be resolved in favor of the latter.

We claim:

1. Method of fastening drive elements on a hollow shaft, which comprises:

pushing [n] drive elements with a thickness [a] over a hollow shaft of a material with a given limit of elasticity, retaining the drive elements at mutual spacings [b] and in respective desired azimuthal positions by means of holding devices; providing *a hydraulic expanding device having* active sections with a length [c], mutual spacings [d] and [being bounded by] sealing lips [on a hydraulic expanding device so that n(a+b)=n(c+d)] *bounding the active sections*, pushing the hydraulic expanding device into the hollow shaft;

applying a pressure through the hydraulic expanding device to the active sections stressing the material of portions of the hollow shaft opposite the active sections radially beyond the given limit of elasticity and into secured engagement with the drive elements;

reducing the pressure at the active sections; and withdrawing the hydraulic expanding device from the expanded hollow shaft.

2. Method according to claim [1] *4*, which comprises making a=c.

[3. Method according to claim 1, which comprises making b=d].

*4. Method according to claim 1, which comprises making* $n.a+(n-1)b=n.c+(n-1)d$, *wherein n is the number of drive elements, a is the thickness of the drive elements, b is the spacing between the drive elements, c is the length of the active sections, and d is the spacing between the active sections.*

* * * * *